United States Patent
Gjerstad et al.

(10) Patent No.: US 9,488,302 B2
(45) Date of Patent: Nov. 8, 2016

(54) TUBULAR JOINT

(75) Inventors: Ole Gjerstad, Drammen (NO); Bo Anders Wiktorsson, Lommedalen (SE); Kristina Ulrika Johansson, Oslo (SE)

(73) Assignee: Vetco Gray Scandinavia AS, Sandvika (NO)

( * ) Notice: Subject to any disclaimer, the term of this patent is extended or adjusted under 35 U.S.C. 154(b) by 167 days.

(21) Appl. No.: 13/825,740

(22) PCT Filed: Sep. 19, 2011

(86) PCT No.: PCT/IB2011/002170
§ 371 (c)(1),
(2), (4) Date: Jul. 16, 2013

(87) PCT Pub. No.: WO2012/038799
PCT Pub. Date: Mar. 29, 2012

(65) Prior Publication Data
US 2013/0285369 A1    Oct. 31, 2013

(30) Foreign Application Priority Data

Sep. 22, 2010 (NO) .................................. 20101320

(51) Int. Cl.
| F16L 23/04 | (2006.01) |
| F16L 23/18 | (2006.01) |
| E21B 33/043 | (2006.01) |
| G01M 3/28 | (2006.01) |

(52) U.S. Cl.
CPC .............. *F16L 23/18* (2013.01); *E21B 33/043* (2013.01); *F16L 23/04* (2013.01); *G01M 3/2861* (2013.01)

(58) Field of Classification Search
CPC ................................ F16L 23/18; F16L 23/04
USPC .............. 285/356–367, 119, 106, 93, 13, 14
See application file for complete search history.

(56) References Cited

U.S. PATENT DOCUMENTS

| 2,211,983 | A | * | 8/1940 | Parris | ............................. 285/110 |
| 2,862,731 | A | * | 12/1958 | Hedden et al. | ............... 285/272 |
| 3,216,746 | A | * | 11/1965 | Watts | ............................ 285/110 |

(Continued)

FOREIGN PATENT DOCUMENTS

| DE | 3420135 A1 * | 12/1985 | .............. F16L 25/02 |
| GB | 2377976 A | 1/2003 | |
| GB | 2413606 | 11/2005 | |

OTHER PUBLICATIONS

International Search Report and Written Opinion dated Jan. 16, 2012 which was issued in connection with PCT/IB2011/002170 which was filed on Sep. 19, 2011.

*Primary Examiner* — David E Sosnowski
*Assistant Examiner* — James Linford
(74) *Attorney, Agent, or Firm* — GE Global Patent Operation

(57) ABSTRACT

A tubular joint has first and second tubular members, a metallic seal ring between the tubular members and having sealing surfaces designed to mate with corresponding sealing surfaces of the tubular members to form a primary seal, an additional seal provided between the tubular members radially outwardly of the primary seal, a fluid channel having an outlet opening in an end surface of the first tubular member radially outwardly of the primary seal and radially inwardly of the additional seal, and annular seal members interposed between the seal ring and the tubular members radially outwardly of the primary seal and radially inwardly of the outlet opening.

13 Claims, 1 Drawing Sheet

(56) References Cited

U.S. PATENT DOCUMENTS

| | | | | |
|---|---|---|---|---|
| 3,329,447 | A * | 7/1967 | Hitz | 285/113 |
| 3,479,063 | A * | 11/1969 | Raver | 285/108 |
| 3,507,506 | A * | 4/1970 | Tillman | 277/614 |
| 3,737,179 | A * | 6/1973 | White, Jr. | 285/96 |
| 3,997,198 | A * | 12/1976 | Linder | 285/98 |
| 4,019,371 | A | 4/1977 | Chaplin et al. | |
| 4,470,609 | A * | 9/1984 | Poe | 285/334.2 |
| 4,569,540 | A * | 2/1986 | Beson | 285/93 |
| 4,852,917 | A * | 8/1989 | Viall, Jr. | 285/353 |
| 5,570,911 | A | 11/1996 | Galle | |
| 5,839,765 | A * | 11/1998 | Carter et al. | 285/334.2 |
| 6,070,912 | A * | 6/2000 | Latham | 285/61 |
| 6,299,216 | B1 * | 10/2001 | Thompson | 285/93 |
| 7,819,439 | B2 * | 10/2010 | Paton et al. | 285/341 |
| 8,096,560 | B2 * | 1/2012 | Pallini et al. | 277/607 |
| 2008/0048443 | A1 * | 2/2008 | Paton | E21B 17/02 285/333 |
| 2011/0185793 | A1 * | 8/2011 | Harrison | 73/46 |

* cited by examiner

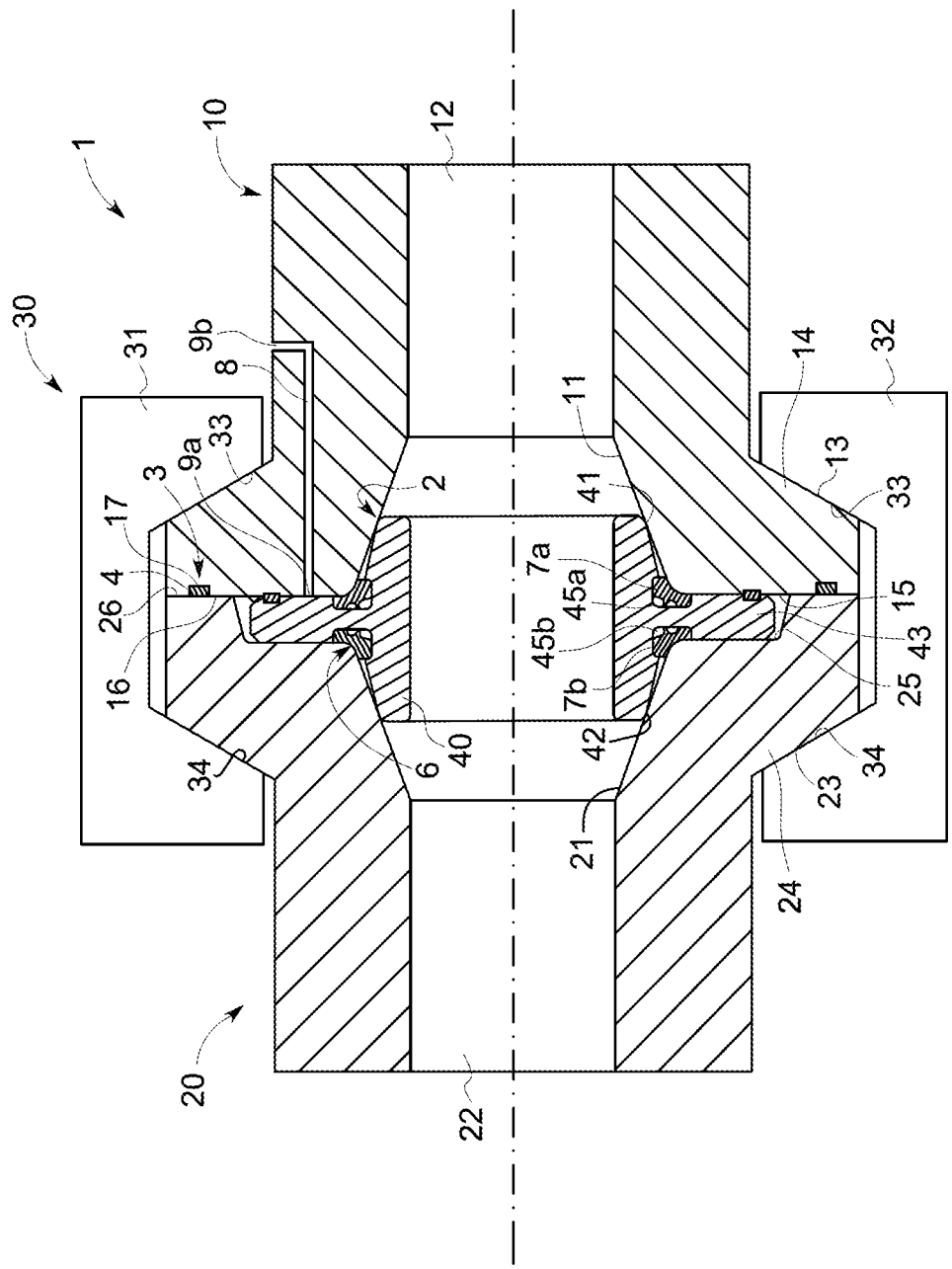

TUBULAR JOINT

CROSS REFERENCE TO RELATED APPLICATIONS

This is a national stage application under 35 U.S.C. §371(c) prior-filed, PCT patent application serial number PCT/IB2011/002170, filed on Sep. 19, 2011, which claims priority to Norwegian Patent Application No. 20101320, filed on Sep. 22, 2010, the entire contents of which are incorporated herein by reference.

BACKGROUND OF THE INVENTION

Development within offshore oil and gas exploration in the recent years has been directed to subsea installations for processing and transport of oil and gas. These subsea installations replace the traditional platforms, where oil and gas were transported up to the platform for further processing and transport. This development of subsea production, processing and transport systems has resulted in an increasing need for tubular joints suitable for subsea use, e.g. for joining fluid conduits belonging to interconnectable processing modules or pipe sections in a fluid-tight manner. It has been realised that seals based on corrosion resistant metallic materials are more suitable than conventional elastomeric seals for use in subsea applications. One known type of tubular joint is provided with a metallic seal ring positioned between tapered inner sealing surfaces of two adjacent tubular members for sealing therebetween. Such a sealing arrangement is very effective for sealing against internal fluid pressure within the tubular members.

In subsea applications, it is often desirable to test the sealing efficiency of the metal-to-metal seal between the seal ring and the tubular members using external fluid pressure. Such testing is often termed back seal testing. This can be accomplished by providing an additional elastomeric seal between the tubular members radially outwardly of the primary metal-to-metal seal formed between the seal ring and the tubular members and introducing a pressurized test fluid into the space between the primary seal and the additional seal through a fluid channel having an outlet opening in an end surface of one of the tubular members at a location radially outwardly of said primary seal and radially inwardly of said additional seal.

Recently, there has been an increasing tendency to require double barrier seals for additional reliability of a tubular joint, both in an environmental context and in order to improve production stability. This can be accomplished by closing the above-mentioned fluid channel and utilizing said additional seal as a secondary seal. A disadvantage with this solution is that the additional seal seals at a larger diameter than the primary metal-to-metal seal. The radial area between the primary metal-to-metal seal and the additional seal will give an increased pressure area for the internal fluid pressure and thereby an increased separation force between the tubular members in case of a fluid leakage over the primary seal. Another disadvantage is the risk for hydrolocking during opening of the tubular joint, which could make it difficult or even impossible to separate the tubular members from each other. Such hydrolocking might occur when there is an underpressure, in relation to the hydrostatic pressure of the surrounding sea-water, in the space between the primary metal-to-metal seal and the additional seal.

BRIEF DESCRIPTION OF THE INVENTION

An object of the present invention is to provide a solution to the above-mentioned problem.

According to embodiments of the invention, this object is achieved by a tubular joint. The tubular joint of the present invention comprises a first tubular member having a tapered inner sealing surface at its outer end; a second tubular member having a tapered inner sealing surface at its outer end; clamping means for clamping the tubular members to each other with the tapered inner sealing surface of the first tubular member facing the tapered inner sealing surface of the second tubular member; a metallic seal ring positioned between the tubular members and having a first outer sealing surface designed to mate with the tapered inner sealing surface of the first tubular member and a second outer sealing surface designed to mate with the tapered inner sealing surface of the second tubular member to form a primary seal upon clamping of the tubular members to each other; an additional seal provided between the tubular members radially outwardly of the primary seal; a fluid channel extending through the first tubular member and having an outlet opening in an end surface of this tubular member at a location radially outwardly of said primary seal and radially inwardly of said additional seal to allow fluid to be introduced between the primary seal and the additional seal through this fluid channel in order to test the sealing efficiency of the primary seal against external fluid pressure; a first annular seal member interposed between the seal ring and the first tubular member radially outwardly of the primary seal and radially inwardly of said outlet opening; and a second annular seal member interposed between the seal ring and the second tubular member radially outwardly of the primary seal and radially inwardly of said outlet opening.

Each of said first and second annular seal members is designed to allow fluid flow past the seal member in a radial direction inwards and to prevent fluid flow past the seal member in a radial direction outwards. Thus, the first and second annular seal members provide a secondary seal for the internal fluid pressure upon clamping of the tubular members to each other, while allowing the sealing efficiency of the primary metal-to-metal seal against external fluid pressure to be tested without introducing any port for pressurized test fluid between the primary seal and this secondary seal, thereby not introducing any additional unnecessary leakage path. Thus, said annular seal members can be located very close to the primary seal, while minimizing the radial area between the primary seal and the secondary seal formed by the annular seal members so as to thereby give a minimal increase of the pressure area for the internal fluid pressure in case of a fluid leakage over the primary seal. An additional advantage is that there is no possibility for hydrolocking between the primary metal-to-metal seal and the secondary seal during opening of the tubular joint.

Further advantages as well as advantageous features of the tubular joint according to the present invention will appear from the dependent claims and the following description.

BRIEF DESCRIPTION OF THE DRAWINGS

These and other features and aspects of the present disclosure will become better understood when the following detailed description is read with reference to the accompanying drawings in which like characters represent like parts throughout the drawings, wherein:

FIG. 1 is a schematic illustration of an embodiment of a tubular joint according to the present invention, as seen in a longitudinal section.

DETAILED DESCRIPTION OF EXEMPLARY EMBODIMENTS OF THE INVENTION

In this description and the subsequent claims, the term "fluid" refers to a flowing medium in gaseous or liquid form. Consequently, the expression "fluid-tight seal" implies a seal that is liquid-tight as well as gas-tight.

An embodiment of a tubular joint 1 according to the present invention is illustrated in FIG. 1. The tubular joint 1 comprises a first tubular member 10 and a second tubular member 20, which are to be connected to each other. The tubular members 10, 20 are of metallic material. Each tubular member 10, 20 has a tapered inner sealing surface 11, 21 at its outer end and an internal through bore 12, 22 extending axially through the tubular member. The tapered inner sealing surface 11, 21 of the respective tubular member is conically shaped. The first tubular member 10 may be welded to an end portion of a first fluid conduit and the second tubular member 20 may be welded to an end portion of a second fluid conduit. Alternatively, one of the tubular members 10, 20 may have a blind or closed bore instead of a through bore.

Furthermore, the tubular joint 1 comprises clamping means 30 of any suitable type for clamping the first tubular member 10 to the second tubular member 20 with the tapered inner sealing surface 11 of the first tubular member facing the tapered inner sealing surface 21 of the second tubular member and with the through bore 12 of the first tubular member aligned with and in fluid communication with the through bore 22 of the second tubular member. In the illustrated example, the clamping means 30 comprises two clamping members 31, 32, each of which being provided with a first inclined inner guide surface 33 for engagement with a corresponding inclined outer guide surface 13 provided on a radially projecting flange 14 at the outer end of the first tubular member 10 and a second inclined inner guide surface 34 for engagement with a corresponding inclined outer guide surface 23 provided on a radially projecting flange 24 at the outer end of the second tubular member 20. The clamping members 31, 32 are arranged on opposite sides of the tubular members 10, 20 and pressed towards each other in the radial direction so as to thereby force the tubular members 10, 20 towards each other in the axial direction under the effect of the inclined guide surfaces 33, 34, 13, 23.

The tubular joint 1 further comprises a metallic seal ring 40, which is positioned between the tubular members 10, 20. The seal ring 40 has a first outer sealing surface 41 designed to mate with the tapered inner sealing surface 11 of the first tubular member and a second outer sealing surface 42 designed to mate with the tapered inner sealing surface 21 of the second tubular member. When the tubular members 10, 20 are clamped to each other, the inner sealing surface 11 of the first tubular member is pressed against the first outer sealing surface 41 of the seal ring and the inner sealing surface 21 of the second tubular member is pressed against the second outer sealing surface 42 of the seal ring, so as to thereby form a fluid-tight metal-to-metal seal between the seal ring 40 and the tubular members 10, 20. This metal-to-metal seal constitutes a primary seal 2 for the internal fluid pressure of the tubular joint 1.

According to an embodiment illustrated in FIG. 1, the first outer sealing surface 41 of the seal ring 40 is slightly tapered and has a rounded edge designed to mate with the tapered inner sealing surface 11 of the first tubular member, and the second outer sealing surface 42 of the seal ring is slightly tapered and has a rounded edge designed to mate with the tapered inner sealing surface 21 of the second tubular member.

According to an embodiment in FIG. 1, the seal ring 40 is provided with an annular projection 43 on its outside between the first outer sealing surface 41 and the second outer sealing surface 42. This annular projection 43 is received in a space between an end surface 15 of the first tubular member and an opposite end surface 25 of the second tubular member. The above-mentioned first and second sealing surfaces 41, 42 of the seal ring are located on opposite sides of the annular projection 43.

An additional fluid-tight seal 3 is provided between the tubular members 10, 20 radially outwardly of the above-mentioned primary seal 2.

In an embodiment of the present invention, illustrated in FIG. 1, said additional seal 3 comprises an annular seal member 4 of elastomeric material, which is interposed between an end surface 16 of the first tubular member and an opposite end surface 26 of the second tubular member and which is mounted in an annular recess 17 provided in the end surface 16 of the first tubular member. The seal member 4 may alternatively be mounted in an annular recess provided in the end surface 26 of the second tubular member.

As an alternative, said additional seal 3 may comprise an annular seal member of elastomeric material which is interposed between the annular projection 43 of the seal ring 40 and the end surface 15 of the first tubular member 10 and which is mounted in an annular recess provided in the annular projection 43 of the seal ring.

The seal member 4 comprises an O-ring.

A secondary seal 6 for the internal fluid pressure of the tubular joint 1 is provided radially outwardly of the primary seal 2 and radially inwardly of said additional seal 3. This secondary seal 6 is formed by a first annular seal member 7a interposed between the seal ring 40 and the first tubular member 10 and a second annular seal member 7b interposed between the seal ring 40 and the second tubular member 20. Each of said first and second annular seal members 7a, 7b is designed to allow fluid flow past the seal member in a radial direction inwards and to prevent fluid flow past the seal member in a radial direction outwards when the tubular members 10, 20 are clamped to each other. This can be achieved in a manner known per se by giving the respective seal member 7a, 7b a profile which makes it self-energized to seal against fluid pressure from the inside and which lets fluid pressure from the outside pass by with minor resistance. The respective seal member 7a, 7b may be of elastomeric material but may alternatively be polymeric or metallic or of any other suitable material, or of a combination of suitable materials.

In an embodiment, the first annular seal member 7a and the second annular seal member 7b each contain an inner recess portion. The inner recess portion of the first annular seal member 7a and the second annular seal member 2b each contains a projection with an end of the projection abutting a corresponding outer surface of the metallic sealing ring 40. The inner recess portion may be comprised of removed material constituting the lip of the annular seal member (7a and/or 7b), which may comprise the secondary seal. The annular seal members allow fluid to pass radially inwards, but block fluid flowing radially outwards.

In an embodiment of the present invention, the first annular seal member 7a of the secondary seal 6 is mounted in a first annular recess 45a provided in the seal ring 40 on a first side of the annular projection 43 and the second annular seal member 7b of the secondary seal 6 is mounted in a second annular recess 45b provided in the seal ring on the opposite side of the annular projection 43. The first annular seal member 7a may alternatively be mounted in an annular recess provided in the first tubular member 10, and the second annular seal member 7b may alternatively be mounted in an annular recess provided in the second tubular member 20. In an embodiment of the present invention, said first annular recess 45a is located at the end of the tapered first outer sealing surface 41 at the part of the seal ring 40 where this sealing surface 41 meets the annular projection 43, and said second annular recess 45b is located at the end of the tapered second outer sealing surface 42 at the part of the seal ring 40 where this sealing surface 42 meets the annular projection 43.

A fluid channel 8 extends through the first tubular member 10 and has an outlet opening 9a in an end surface 15 of this tubular member at a location radially outwardly of said primary and secondary seals 2, 6 and radially inwardly of said additional seal 3. Owing to the fact that the annular seal members 7a, 7b of the secondary seal 6 allow fluid flow past the seal members in a radial direction inwards, the sealing efficiency of the primary seal 2 against external fluid pressure can be tested by means of pressurized test fluid introduced between the primary seal 2 and the additional seal 3 through the fluid channel 8, despite the fact that the seal members 7a, 7b of the secondary seal 6 are located between the primary seal 2 and the outlet opening 9a of the fluid channel 8.

The first annular seal member 7a may be mounted at any radial position between the primary seal 2 and the outlet opening 9a, and the second annular seal member 7b may be mounted at any radial position between the primary seal 2 and the outlet opening 9a.

When the sealing efficiency of the primary seal 2 is to be tested for determining if the outer sealing surfaces 41, 42 of the seal ring 40 and the corresponding inner sealing surfaces 11, 21 of the tubular members 10, 20 are providing a leak proof sealing, a pressure generating device (not shown) is connected to the inlet opening 9b of the fluid channel 8. The pressure generating device can be a pump that pumps a gaseous or liquid test fluid into the fluid channel 8 through the inlet opening 9b. When the sealing efficiency of the primary seal 2 has been tested, the inlet opening 9b of the fluid channel 8 is left open or closed by means of a non-pressure retaining plug in order to prevent hydrolocking of the space between the primary seal 2 and the additional seal 3.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A tubular joint comprising:
    a first tubular member having a tapered inner sealing surface at its outer end;
    a second tubular member having a tapered inner sealing surface at its outer end;
    a clamping means for clamping the tubular members to each other with the tapered inner sealing surface of the first tubular member facing the tapered inner sealing surface of the second tubular member;
    a metallic seal ring comprising an annular projection positioned between the tubular members and having a first outer sealing surface designed to mate with the tapered inner sealing surface of the first tubular member and a second outer sealing surface designed to mate with the tapered inner sealing surface of the second tubular member to form a primary seal upon clamping of the tubular members to each other;
    an additional seal provided between the tubular members radially outwardly of the primary seal; and
    a fluid channel extending through the first tubular member and having an outlet opening in an end surface of the first tubular member at a location radially outwardly of the primary seal and radially inwardly of the additional seal to allow fluid to be introduced between the primary seal and the additional seal through the fluid channel in order to test sealing efficiency of the primary seal against external fluid pressure,
wherein:
    a first annular seal member is interposed between the metallic seal ring and the first tubular member radially outwardly of the primary seal and radially inwardly of the outlet opening of the fluid channel;
    a second annular seal member is interposed between the metallic seal ring and the second tubular member radially outwardly of the primary seal and radially inwardly of the outlet opening of the fluid channel; and
    each of the first and second annular seal members have a profile to allow fluid flow past the seal member in a radial direction inwards and to prevent fluid flow past the seal member in a radial direction outwards, and wherein the first annular seal member and the second annular seal member each contain an inner recess portion, wherein each of the recess portions respectively contains a projection with an outermost end of the projection abutting a corresponding outer surface of the metallic sealing ring.

2. The tubular joint according to claim 1, wherein the first and second annular seal members are made up at least one of elastomeric, polymeric and metallic material.

3. The tubular joint according to claim 1, wherein the first annular seal member is mounted in a first annular recess provided in the metallic seal ring or in the first tubular member; and
    the second annular seal member is mounted in a second annular recess provided in the metallic seal ring or in the second tubular member.

4. The tubular joint according to claim 1, wherein the first and the second annular seal members form a secondary seal against internal fluid pressure.

5. The tubular joint according to claim 1, wherein the metallic seal ring comprises the annular projection between the first and the second outer sealing surfaces.

6. The tubular joint according to claim 5, wherein the annular projection is positioned between the first and the second tubular members.

7. The tubular joint according to claim 5, wherein the additional seal comprises an annular seal member made up of elastomeric material.

8. The tubular joint according to claim 7, wherein the first and second annular seal members are mounted in an annular recess provided in the first tubular member or in the second tubular member.

9. The tubular joint according to claim 7, wherein the first and second annular seal members are mounted in an annular recess provided in the annular projection of the metallic seal ring.

10. The tubular joint according to claim 7, wherein the first and second annular seal members is comprise an O-ring.

11. The tubular joint according to claim 1, wherein the first and the second tubular members are made up of metallic material.

12. The tubular joint according to claim 1, wherein the tapered inner sealing surface at the outer end of the first and the second tubular members has a conical shape.

13. The tubular joint according to claim 1, wherein the first and the second outer sealing surfaces of the metallic seal ring have a rounded edge.

* * * * *